US011445809B2

(12) United States Patent
Swain et al.

(10) Patent No.: US 11,445,809 B2
(45) Date of Patent: Sep. 20, 2022

(54) VERTICALLY ROTATING GROOMING ATTACHMENT BRUSH AND METHOD OF USE

(71) Applicant: Florida Institute of Technology, Inc., Melbourne, FL (US)

(72) Inventors: Geoffrey Swain, Melbourne, FL (US); Michael Harper, Ponte Vedra, FL (US); Melissa Tribou, Satellite Beach, FL (US); Harrison Arthur Gardner, Palm Bay, FL (US); Caglar Erdogan, Melbourne, FL (US)

(73) Assignee: Florida Institute of technology, Inc., Melbourne, FL (US)

( * ) Notice: Subject to any disclaimer, the term of this patent is extended or adjusted under 35 U.S.C. 154(b) by 0 days.

(21) Appl. No.: 16/361,177

(22) Filed: Mar. 21, 2019

(65) Prior Publication Data
US 2019/0216211 A1  Jul. 18, 2019

Related U.S. Application Data

(63) Continuation-in-part of application No. 14/846,701, filed on Sep. 4, 2015, now abandoned.
(Continued)

(51) Int. Cl.
*B63B 59/00* (2006.01)
*A46B 9/02* (2006.01)
(Continued)

(52) U.S. Cl.
CPC ............. *A46B 9/02* (2013.01); *A46B 13/008* (2013.01); *B08B 1/002* (2013.01); *B08B 1/04* (2013.01);
(Continued)

(58) Field of Classification Search
CPC ......... A46B 9/02; A46B 13/008; B08B 1/002; B08B 1/04; B63B 59/08; E02B 17/0034; E04H 4/1663
(Continued)

(56) References Cited

U.S. PATENT DOCUMENTS 3,024,883 A  3/1962 Eriksson
3,628,489 A * 12/1971 Michaelsen ............. B63B 59/08
                                                  114/222
(Continued)

FOREIGN PATENT DOCUMENTS

WO  WO-2016033678 A1 *  3/2016  ............... B08B 1/04

OTHER PUBLICATIONS

Engineering Tool Box, (2008). Polymers—Physical Properties. [online] Available at: https://www.engineeringtoolbox.com/polymer-properties-d_1222.html [Accessed Sep. 10, 2020]. (Year: 2008).*
(Continued)

*Primary Examiner* — Katina N. Henson
(74) *Attorney, Agent, or Firm* — Lowndes; Stephen C. Thomas

(57) ABSTRACT

A rotating grooming brush comprising a brush hub having grooming elements and shroud elements, and method for grooming a surface having an unwanted material thereon. The elements extend from the brush hub and may be positioned near its outer periphery. The elements may be grooming elements forming an array and shroud elements forming a shroud array. A rigid or elastomeric shroud extending from the brush hub surface may optionally be included about the edge of the brush hub, to the outside of the grooming elements. Rotation of the grooming attachment brush causes a low pressure region to build in the central area of the brush. This low pressure region creates a resulting force that forcefully attracts the grooming attach-
(Continued)

ment brush to the surface to be groomed. The resulting force is controlled by the diameter of the brush hub, arrangement, of the elements and the speed of rotation.

19 Claims, 7 Drawing Sheets

Related U.S. Application Data

(60) Provisional application No. 62/045,711, filed on Sep. 4, 2014.

(51) Int. Cl.
*A46B 13/00* (2006.01)
*B08B 1/00* (2006.01)
*B08B 1/04* (2006.01)
*B63B 59/08* (2006.01)
*E02B 17/00* (2006.01)
*B63B 59/06* (2006.01)

(52) U.S. Cl.
CPC .......... *B63B 59/08* (2013.01); *E02B 17/0034* (2013.01); *B63B 59/06* (2013.01)

(58) Field of Classification Search
USPC .................................... 15/180, 1.7; 114/222
See application file for complete search history.

(56) References Cited

U.S. PATENT DOCUMENTS

| | | | | |
|---|---|---|---|---|
| 4,041,565 | A * | 8/1977 | Hatley | A46B 13/008 15/200 |
| 4,114,225 | A | 9/1978 | Malish | |
| 5,852,984 | A * | 12/1998 | Matsuyama | B63B 59/10 114/222 |
| 5,891,063 | A | 4/1999 | Vigil | |
| 5,906,021 | A * | 5/1999 | Coffey | A47L 1/06 15/1.7 |
| 6,070,547 | A * | 6/2000 | Achord | B63B 59/10 114/222 |
| 6,735,804 | B2 | 5/2004 | Carlucci | |
| 7,788,756 | B2 | 9/2010 | Kraemer | |
| 2004/0051291 | A1 * | 3/2004 | Feiertag | F16D 3/065 280/775 |
| 2004/0107521 | A1 | 6/2004 | Chan | |
| 2010/0076598 | A1 * | 3/2010 | Herbert | B62D 57/02 700/245 |

OTHER PUBLICATIONS

Robinson Rubber Products Company, Inc.—Rubber Material Selection Guide. [online]. Available at: https://www.robinsonrubber.com/pdfs/NitrileRubber.pdf [Accessed Sep. 10, 2020] (Year: 2005).*
Nanney, Mark Harrison., Design of a Rotating Brush Underwater Grooming Device with a Focus on Brush Optimization, Motor Control and Design for Reliability, Thesis, Florida Institute of Technology Melbourne, Florida Dec. 2016.
Tribou, Melissa Eileen, Brush Development for Underwater Ship Hull Coating Maintenance, Dissertation, Florida Institute of Technology, Melbourne, Florida Dec. 2015.
Melissa Tribou; Geoffrey Swain, (2015) Grooming using rotating brushes as a proactive method to control ship hull fouling, Biofouling, 31:4, 309-319.
Melissa Tribou; Geoffrey Swain, Brush Development for Ship Hull Grooming, Florida Institute of Technology, Center for Corrosion and Biofouling Control, Department of Marine and Environmental Systems.
Harper, Michael Thomas, Optimized brush design for grooming and vehicle attachment, M.S. Thesis, Florida Institute of Technology, Jul. 2014.
Tribou, Melissa, Brush development for underwater ship hull coating maintenance, Ph.D. Dissertation, Florida Institute of Technology, Dec. 2015.
Nanney, Mark, Design of a Rotating Brush Underwater Grooming Device with a Focus on Brush Optimization, Motor Control and Design for Reliability, M.S. Thesis, Florida Institute of Technology, Dec. 2016.
Erdogan, Caglar, The design of an articulating five headed in-water grooming tool to maintain ships free of fouling, M.S. Thesis, Florida Institute of Technology, Dec. 2016.
Tribou, Melissa, Swain, Geoffrey, The use of proactive in-water grooming to improve the performance of ship hull anti-fouling coatings, Biofouling, (Oct. 16, 2009), vol. 26, No. 1, Taylor and Francis, United Kingdom.
Swain, Geoffrey, Tribou, Melissa, Grooming as an option for fouling control. Journal of Ocean Technology, 2014 (Fall), vol. 9, No. 4, Memorial University, Canada.
Tribou, Melissa, Swain, Geoffrey, Grooming using rotating brushes as a proactive method to control fouling, Biofouling, (May 18, 2015), vol. 31, No. 4, 309-319, Taylor and Francis, United Kingdom.
Tribou, Melissa, Swain, Geoffrey, Brush development for ship hull grooming. World Maritime Technology Conference, (Nov. 3, 2015) H205, Providence, Rhode Island, World Maritime Technology Congress.
Hearin, John, Hunsucker, Kelli Z., Swain, Geoffrey, Stephens, Abraham, Gardner, Harrison, Lieberman, Kody, Harper, Michael, Analysis of long-term mechanical grooming on large-scale test panels coated with an antifouling and a fouling-release coating, Biofouling, (Sep. 11, 2015) vol. 31, No. 8, 625-638, Taylor and Francis, United Kingdom.
Hearin, John, Hunsucker, Kelli Z., Swain, Geoffrey, Gardner, Harrison, Stephens, Abraham, Lieberman, Kody, Analysis of mechanical grooming at various frequencies on a large scale test panel coated with a fouling-release coating, Biofouling, (Apr. 7, 2016), vol. 32, No. 5, 561-569, Taylor and Francis, United Kingdom.
Tribou, Melissa, Swain, Geoffrey, The effects of grooming on a copper ablative coating: a six year study. Biofouling, (Jun. 12, 2017), vol. 33, No. 6, 494-504, Taylor and Francis, United Kingdom.
Hunsucker, Kelli Z., Vora, Gary J., Hunsucker, J. Travis, Gardner,Harrison, Leary, Dagmar H., Kim, Seongwon, Lin, Baochuan, Swain,Geoffrey, Biofilm community structure and the associated drag penalties of a groomed fouling release ship hull coating, Biofouling (Jan. 18, 2018), vol. 34, No. 2, 162-172, Taylor and Francis, United Kingdom.

* cited by examiner

|  | Brush Diameter (cm) | | | |
|---|---|---|---|---|
| Shroud Height (cm) | 7.6 | 10.2 | 12.7 | 15.2 |
| 0 | 8.26 | 14.4 | 20.7 | 28.4 |
| 0.32 | 9.95 | 16.3 | 21.9 | 31.8 |
| 0.95 | 10.8 | 16.3 | 24.9 | 33.7 |
| 1.58 | 11.3 | 17.1 | 25.6 | 38.4 |
| 2.22 | 11.7 | 15.8 | 23.6 | 31.9 |
| 2.86 | 11.7 | 14.9 | 21.3 | 31.7 |

VERTICALLY ROTATING GROOMING ATTACHMENT BRUSH AND METHOD OF USE

CROSS REFERENCE TO RELATED APPLICATIONS AND INCORPORATION BY REFERENCE

This non-provisional patent application filed under 35 U.S.C. 111(a) is a continuation-in-part of U.S. non-provisional patent application Ser. No. 14/846,701 titled VERTICALLY ROTATING GROOMING ATTACHMENT BRUSH AND METHOD OF USE, filed in the United States Patent and Trademark Office (USPTO) on Sep. 4, 2015, which is herein incorporated by reference in its entirety, which claims the benefit of priority to U.S. provisional patent application Ser. No. 62/045,711 filed in the USPTO on Sep. 4, 2014, which is also herein incorporated by reference in its entirety.

STATEMENT REGARDING FEDERALLY SPONSORED RESEARCH OR DEVELOPMENT

This invention was made with government support under contract number N00014-11-1-0915 (Large Scale Seawater Facility for Development of Hullbug) awarded by the Office of Naval Research and contract number N00014-16-1-3050 (Large Scale Seawater Facility for the Development of Ship Hull Grooming) awarded by the Office of Naval Research. The Government has certain rights in this invention.

INCORPORATION-BY-REFERENCE OF MATERIAL SUBMITTED ON A COMPACT DISK

Not applicable.

BACKGROUND OF THE INVENTION

Field of the Invention

The present disclosure generally relates to systems and methods for removing unwanted materials such as silts, slimes and incipient biofouling from surfaces in marine and freshwater environments and for maintaining fouling control coatings in an active condition. Such systems and methods apply to, among other things, ship hull grooming. More specifically, the system and method of the invention apply to a grooming brush for use in ship hull grooming and a method of using a grooming attachment brush for grooming. The surface to be groomed may be, for example and not by way of limitation, a surface of a hull of a ship. Such ship hull surfaces may comprise a fouling control surface, such as a coating, upon which the early stages of biofouling may be occurring. The grooming brush, or a plurality of grooming brushes, of the invention may be attached to a device to rotate them as described herein. In some instances the brushes may be attached to a system for motivating them across a ships hull, for example, with the use of a remotely piloted vehicle.

Background

Navy ships spend a significant amount of time at port and accumulate biofouling that increases the ship's drag and fuel consumption. One of the current practices is to wait until hard fouling becomes established and to remove the fouling from the hull by diver-operated cleaning vehicles. These use stiff brushes that may damage the ship's protective coating that is intended to protect the ship's hull. A proactive approach to controlling fouling, called grooming, may also be used. Grooming utilizes softer brushes than the systems used to remove hard fouling, and cleans the surfaces of ship hulls at a frequency that removes incipient fouling and maintains the coating surface in a smooth and clean condition.

An autonomous underwater vehicle (described in U.S. Pat. No. 8,506,719 to Holappa et al.) called HULL BUG™ has been designed to implement the grooming process. The vehicle attaches to the hull by a low pressure region generated by a semi-closed impeller (described in U.S. Pat. No. 6,497,553 to Illingworth et al.) and has a separate grooming tool comprised of vertically rotating brushes.

There are also commercial cleaning vehicles currently available on the market (described in U.S. Pat. Nos. 3,906,572; 5,947,051; 8,393,421; 6,886,486). All of these designs attach the vehicle to a surface by the use of an open impeller or a magnet.

A commercial cleaner (described in U.S. Pat. No. 6,209,473 to Jones) utilizes the negative pressure generated by its rotating members to attach itself to a surface; however, the rotating members are designed to create turbulence and do not touch the surface.

What is needed in the art, therefore, is an apparatus, such as the system and method of the present invention, that is adapted to attach itself to a surface to be cleaned, or groomed, that attaches with a high enough attractive force to enable it to effectively groom or clean a surface such as a surface of a ship hull having biofouling, and that the attractive force between the grooming apparatus and the ship hull, or ship hull coating, may be controllable to apply sufficient force to remove fouling without causing damage or excessive wear to the ship coating.

BRIEF SUMMARY OF THE INVENTION

The present invention comprises an apparatus and method that have one or more of the following features and/or steps, which alone or in any combination may comprise patentable subject matter.

In accordance with the teachings disclosed herein, embodiments related to a vertically rotating grooming attachment brush and method of use are disclosed.

Embodiments of the present invention are designed to remove unwanted material for example, inorganic buildup such as silt, slime-like biofilms, and early stages of fouling, from surfaces of marine and freshwater structures such as, for example, surfaces of ship hulls. The grooming attachment brush comprises a brush hub and an arrangement of grooming elements further comprised of bristles grouped into tufts or flexible studs, in any combination. Rotation of the grooming attachment brush creates a vortical flow in the brush hub which generates a low pressure region in the central area of the brush hub. This low pressure region creates a resulting force that attracts, or pulls, the grooming attachment brush to the surface to be groomed, thereby attaching it to the surface.

The present method and device of the invention overcome the shortcomings of the prior art by attaching to a surface to be cleaned, such as a ship hull or other surface. The attachment forces are controlled by the arrangement of the grooming elements and rotational velocity of the grooming brush. The forces generated by the brush can therefore be set to match the forces required to remove the unwanted material, such as biofouling, without creating damage or wear to the surface to be groomed, or any protective coating it may have. The present method and device of the invention may be utilized to clean underwater surfaces other than surfaces of ships, and to remove unwanted materials therefrom.

In an embodiment, which is one of many embodiments of the invention, the grooming brush comprises a circular brush hub having an attachment surface, or first surface, upon which grooming elements are attached. The grooming elements may be comprised of bristle tufts or flexible studs, arranged in an array, extending from the attachment surface and positioned at or near the periphery of the brush grooming element attachment surface. In this specific embodiment, the grooming brush may also comprise a row of shroud elements which are comprised of flexible studs extending from the brush hub first, or attachment, surface, and positioned along and exterior to the row of grooming bristles. In this specific embodiment, the grooming elements extend from the hub first, or attachment, surface further than the flexible stud shroud elements extend from the hub.

In alternate embodiments, the grooming brush comprises a brush hub having a row of grooming bristles extending from the brush hub first, or attachment, surface that are positioned at or near a periphery of the brush hub, and a row of shroud elements extending from the brush hub first, or attachment, surface and positioned along and interior to the row of grooming bristles, in which the grooming bristles extend from the tuft attachment surface further than the shroud bristles extend from the brush hub first, or attachment, surface.

In a further alternate embodiment, the grooming brush comprises a brush hub having a brush hub first, or attachment, surface, a row of shroud elements extending from the brush hub first, or attachment, surface and positioned at or near a periphery of the brush hub, and a row of grooming elements extending from the brush hub first, or attachment, surface and positioned along the interior of the row of grooming bristles, in which the grooming bristles extend from the brush hub first, or attachment, surface further than the shroud bristles extend from the brush hub first, or attachment, surface.

In yet a further alternate embodiment, the grooming brush comprises a brush hub having a brush hub first, or attachment, surface and a row of shroud bristles and grooming bristles extending from the brush hub first, or attachment, surface and positioned at or near a periphery of the brush hub, wherein the grooming bristles extend from the brush hub first, or attachment, surface further than the shroud bristles extend from brush hub first, or attachment, surface.

In embodiments the brush hub may be circular in shape.

In yet a further alternate embodiment, the grooming attachment brush further comprises a rigid shroud positioned about the periphery of the brush hub, and the grooming elements extend from the brush hub first, or attachment, surface further than the shroud extends from the brush hub first, or attachment, surface.

In a still further alternate embodiment, the grooming attachment brush further comprises one or more shroud bristle tufts positioned near the center of the brush hub in an impeller vein shape.

The shroud elements of the invention and the grooming elements of the invention may be, but are not necessarily, the same in number. In embodiments in which the shroud elements and the grooming elements are the same in number, each shroud elements may be, but is not necessarily, radially aligned with a grooming element.

The method of the invention may comprise providing a surface to be cleaned, providing at least one grooming brush having a row of grooming bristles having tips, the grooming elements extending from a brush hub first, or attachment, surface and positioned at or near a periphery of brush hub, and a row of flexible stud shroud elements also having tips, the shroud flexible studs extending from the brush hub first, or attachment, surface and positioned exterior to the row of grooming bristles The method of the invention may utilize any number of grooming brushes and the speed of rotation of the brush or brushes may be varied to arrive at a desired force imparted to the unwanted material being removed from the surface to be groomed, or from its protective coating, without damage to such protective coating. The rotation of the brush or brushes may result in a resulting force tending to pull, or attract, the grooming brush against the surface to be groomed or its protective coating.

In an alternate embodiment, the method of the invention may further comprise at least one grooming attachment brush having a plurality of grooming extending from the brush hub first, or attachment, surface and positioned near the center of the brush hub in an impeller vein shape.

In a still further alternate embodiment, the method of the invention may further be defined as being utilized on the surface of ship having biofouling.

In a still further alternate embodiment, the method of the invention may further be defined as the rotational speed of the at least one grooming attachment brush being greater than 200 rotations per minute or between 200 and 1100 rotations per minute.

In a still further alternate embodiment, the method the invention may further be defined as wherein the at least one grooming brush further comprises a plurality of shroud elements extending from the brush hub first, or attachment, surface and positioned near the center of the brush hub in an impeller vein shape.

In embodiments, grooming brushes of the invention may be oriented such that their axis of rotation is more or less perpendicular to the force of gravity (i.e, the axis of rotation is more or less horizontal). In such embodiments, the brush element tips may move in a circular pattern defined by a more or less vertical plane that is coplanar with the more or less vertical surface of a ship hull. Thus, the brushes may be referred to as "vertically rotating" grooming brushes.

Additionally, since the brushes may be attached to a device or system for rotating them, the grooming brushes of the invention may be referred to as "grooming attachment brushes" or simply "attachment brushes".

The grooming brush of the invention may be rotated either clockwise or counterclockwise in use, as viewed from the surface to be groomed.

While the embodiments described herein may reference grooming of a ship hull or fouling control coating, the invention may be utilized to groom any underwater surface.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings:

FIG. 4, also depicts an optional feature of impeller elements arranged in an impeller vein pattern, which may be present in embodiments of the invention, is also depicted. The dashed lines represent one of many embodiments of a line upon which the centers of the impeller elements may be disposed in order to achieve the impeller vein shape.

In the figures, like callouts refer to like elements.

DETAILED DESCRIPTION OF THE INVENTION

The following documentation provides a detailed description of embodiments of the invention.

As used herein, "groom" means to apply a force to a surface from which it is desired to remove incipient biofouling or other unwanted materials, including lightly adhered unwanted materials, which may be any material, organic or inorganic.

As used herein, "surface to be groomed" includes within its meaning any surface from which it is desired to remove biofouling or other unwanted materials, which may be any material, organic or inorganic, and also includes all coatings which may have been applied to such surfaces.

As used herein, "in proximity" means within 0.5 inches.

A detailed description of the embodiments for a vertically rotating grooming attachment brush will now be presented with reference to FIGS. 1-11. One of skill in the art will recognize that these embodiments are not intended to be limitations on the scope, and that modifications are possible without departing from the spirit thereof. In certain instances, well-known methods, procedures, components, and circuits have not been described in detail.

Embodiments of the present invention can remove unwanted materials such as, for example, inorganic silt, slime-like biofilms and incipient fouling from the surfaces of marine and freshwater structures, such as, for example, ship hulls. Such structures may be coated with fouling control coatings or other coatings. Embodiments of the present invention can also be used on offshore floating structures and fixed structures, sides of aquaria and any other submerged or partially submerged structure that have unwanted accumulations of biofouling, organic and inorganic matter. When grooming the surfaces of such structures, it is usually desired that the forces exerted on the unwanted material which is to be removed from the surface is great enough to remove the unwanted materials, but not so great as to damage or cause wear to any fouling control coatings or other coatings that may be present on the surface to be groomed.

Figure 1:
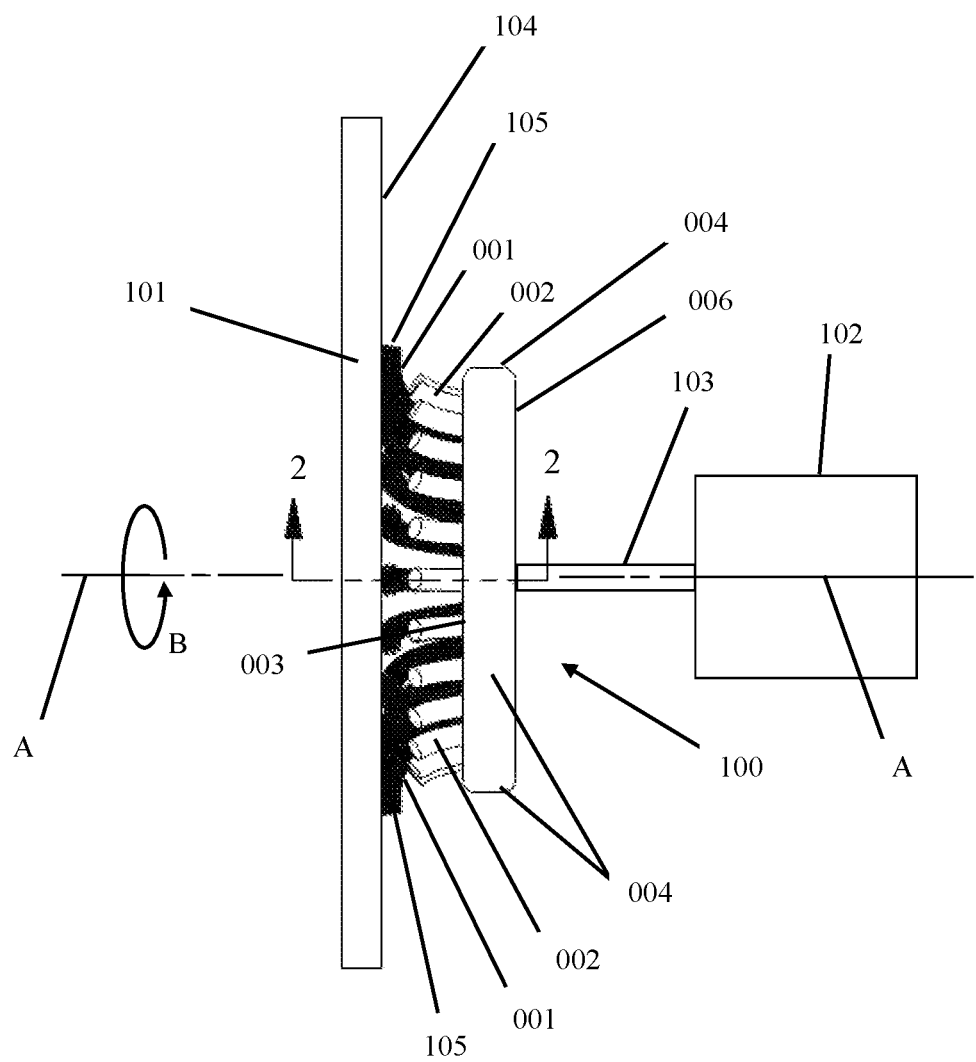
FIG. 1 is a side view of an embodiment of the invention, depicting the grooming brush placed against a surface to be groomed, causing the grooming elements of the invention to contact the surface to be groomed, and depicting the rotation of the brush applying a grooming force between the grooming elements and the unwanted material, which may be, for example, silt, slimes and incipient biofouling, causing the unwanted material to be removed from the surface to be groomed.

Referring now to FIG. 1, an embodiment of the grooming brush of the invention is shown as it would appear when grooming a surface to be groomed 104 on a structure 101. In this embodiment, the grooming brush of the invention 100 comprises a brush hub 006 and an arrangement of grooming elements 001 and shroud elements 002. Brush hub 006 has a first surface 003 to which grooming elements 001 and shroud elements 002 are attached, an outer periphery 004, and an axis A of rotation B. Grooming brush 001 may be attached to a shaft or other drive mechanism 103 to a source of rotation 102 that, when powered, causes grooming brush 100 to rotate about axis of rotation A as indicated by arrow B. The source of rotation 102 may be any source of rotation such as electric motor, or a coupling to an electric motor. The direction of rotation indicated by arrow B is exemplary only; the grooming brush of the invention 100 may rotate in either direction.

Still referring to FIG. 1, in an embodiment, the source of rotation 102 may be an electric motor that may be battery powered, housed in a handheld waterproof housing, and used with a single or a plurality of grooming brushes of the invention with an overall package dimension and weight that it may be used in handheld fashion by, for example, an underwater diver. In other embodiments, one or a plurality of grooming brushes of the invention may be coupled to an apparatus such as the remotely operated vehicle previously described, and used for more industrial hull grooming of larger vessels. These other embodiments may employ any source of rotation such as electric or hydraulic motors.

Still referring to FIG. 1, a plurality of shroud elements 002 may be attached to, and extend away from, the first surface 003 of grooming brush 001. Likewise, a plurality of grooming elements 001 may be attached to, and extend away from, the first surface 003 of grooming brush 100. Each shroud element 002 may be defined as having a first length and each grooming element 001 may be defined as having a second length, where the first length may be less than said second length, thus causing the grooming elements 001 to extend further from the first surface 003 of brush hub 006 further than the shroud elements 002 extend from the first surface 003. The plurality of shroud elements 002 are attached to the first surface 003 forming a shroud element array, in which the shroud element array may be inset from the brush hub outer periphery 004 by a shroud element inset distance E (E is not called out in FIG. 1 but is called out in FIG. 2); and the plurality of grooming elements 001 are attached to the first surface 003, forming a grooming element array, and the grooming element array may be inset from said brush hub outer periphery by a grooming element inset distance F (F is not called out in FIG. 1 but called out in FIG. 2). The grooming element inset distance, depicted in FIG. 2 as F, may greater than the shroud element inset distance which is depicted in FIG. 2 as E, causing the grooming element array to be disposed interior to the shroud element array; i.e. in this embodiment, the grooming element array is disposed closer to the axis of rotation A than the shroud element array.

Still referring to FIG. 1, in an embodiment, the outer periphery 004 of brush hub 006 may be circular in shape, and the axis of rotation A may pass through the center of brush hub 006, which in the embodiment depicted in FIG. 1, is established by circular periphery 004. However, it is not required that brush hub outer periphery be circular in shape.

Still referring to FIG. 1, in an embodiment, the quantity of shroud elements forming the plurality of shroud elements and the quantity of grooming elements forming the plurality of shroud elements are the same in number. Still further, each shroud element may be, but is not necessarily, radially aligned with a corresponding grooming element; and each shroud element may be disposed at a first angle $\beta$ (see FIG. 6) relative to the brush hub first surface 003, and each grooming element may be disposed at a second angle $\alpha$ (see FIG. 6) relative to the brush hub first surface 003, the first angle being greater than the second angle, such that each shroud element is in contact with and supports its corresponding grooming element at point G (see FIG. 2) when the grooming brush 100 is pulled against a surface to be groomed 104 by a forces such as resulting force D (see FIG. 2) causing the grooming elements distal ends 105 to bend away from the grooming brush axis of rotation A as they contact the surface to be groomed 104 and apply a grooming force to unwanted material, such as biofouling, that is present on surface to be groomed 104.

Figure 2:
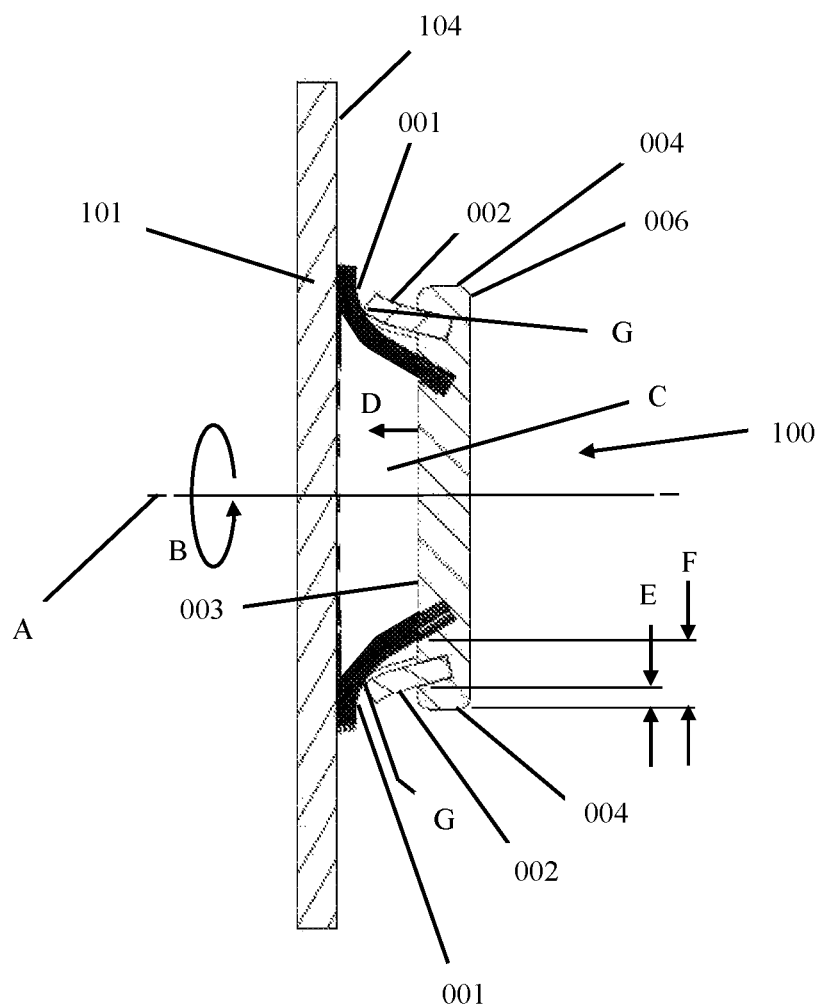
FIG. 2 is a cross section of an embodiment of a grooming brush 100 of the invention, showing a substantially enclosed volume C created by the surface to be groomed 104, the grooming element array formed by the plurality of grooming elements 001, and the first surface 003 of brush hub 006.

Referring now to FIG. 2, a cross section of an embodiment of a grooming brush 100 of the invention is depicted, showing a substantially enclosed volume C created by surfaces of the surface to be groomed 104, the grooming element array formed by the plurality of grooming elements 001, and the first surface 003 of brush hub 006 to which the grooming and shroud elements are attached. The grooming brush is placed against the surface to be groomed 104, which may be a surface of a structure 101 such as, for example, a ship hull or any underwater structure. As the grooming brush rotates around axis A as depicted by arrow B, vortical fluid flow is created, causing substantially enclosed volume C have lower pressure than the surrounding water. This low pressure in substantially enclosed volume C causes grooming brush 100 to be pulled towards the surface to be cleaned 104 by a resulting force D that is proportional to the speed of rotation of the grooming brush 100 about axis A. The resulting force D developed between the brush and the surface to be groomed 104 is a function of the hub diameter; the shroud element 002 length, diameter and modulus; the speed of rotation of the brush 100; the grooming elements normal forces and attraction forces developed by the low pressure cell and any wheels, castors or rollers that may be used to control the distance the grooming brush 100 set off from the surface to be groomed 104. Resulting force D pulls the grooming brush 100 against the surface to be cleaned 104 and may be great enough to hold grooming brush 100 against the surface to be cleaned 104 with very little or no other force required. This enables the forces imparted by the grooming elements on the unwanted materials to cause the unwanted materials to be removed from the surface to be groomed 104 as brush 100 rotates about axis A. The speed of rotation of grooming brush 100 may be adjusted to an optimal speed of rotation, or range of speeds of rotation, such that the resulting force D is large enough that unwanted material is removed from the surface to be groomed 104 without causing damage or wear to the surface that is being groomed or any coating thereon. The grooming element inset distance, depicted as F, may greater than the shroud element inset distance which is depicted in as E, causing the grooming element array to be disposed interior to the shroud element array; i.e. in this embodiment the grooming element array is disposed closer to the axis of rotation A and center of brush hub 006 than the shroud element array. Contact point G between a shroud element 002 and a grooming element in a grooming element—shroud element pair is depicted. Brush hub outer periphery 004 is called out for reference.

Figure 3:
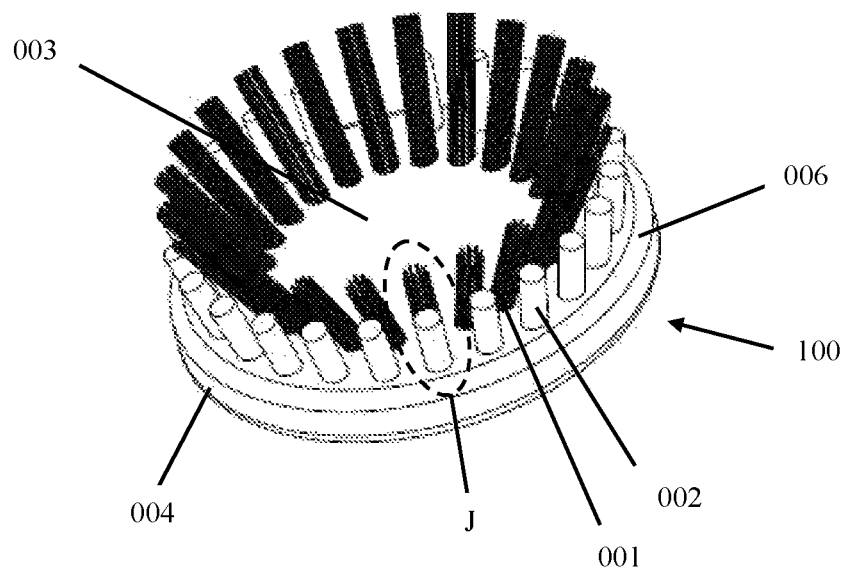
FIG. 3 is a perspective view of an embodiment of a grooming brush of the invention having two rows of elements forming two arrays, a grooming element array and a shroud element array, where the grooming element array is disposed interior to the shroud element array; and wherein each shroud element is radially aligned with a corresponding grooming element forming a grooming element—shroud element pair.

Referring now to FIG. 3, a perspective view of an embodiment of a grooming brush of the invention is depicted. In this embodiment, the grooming brush 100 has two rows of elements, a grooming element array comprising a plurality of grooming elements 001, and a shroud element array comprising a plurality of shroud elements 002, where the grooming element array is disposed interior to the shroud element array. In this embodiment, the outer periphery 004 of brush hub 006 is circular, and the shroud elements and grooming elements are the same in number, forming radially aligned grooming element—shroud element pairs as indicated by J. Brush hub first surface 003 is called out for reference.

Figure 4:
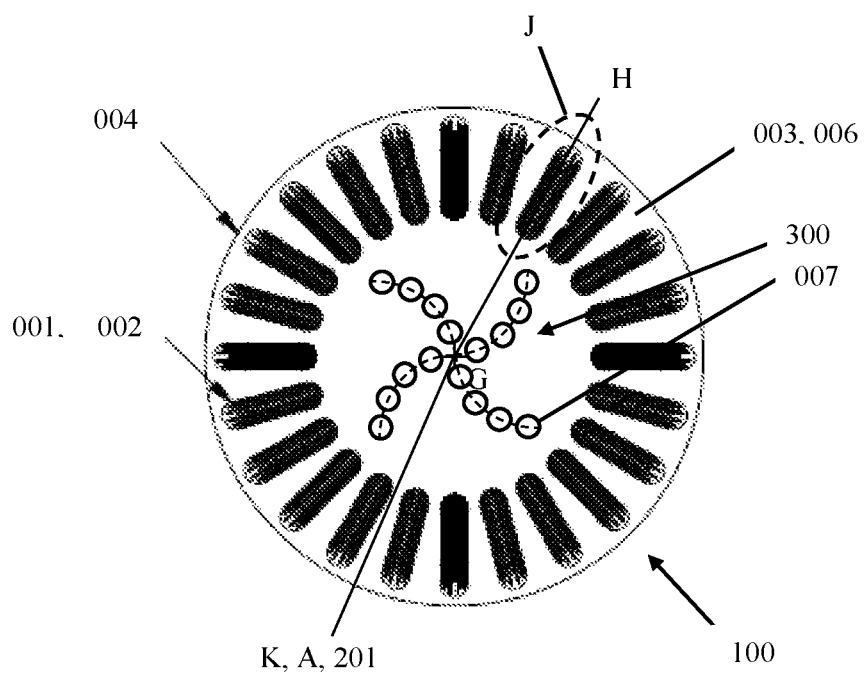
FIG. 4 is an orthogonal view of an embodiment of a grooming brush 100 of the invention in which the outer periphery of the brush hub 004 is circular, the grooming element array has twenty-four grooming elements equidistantly spaced and arranged in a circular pattern, the shroud element array has twenty-four shroud elements equidistantly spaced and arranged in a circular pattern, and wherein each shroud element is radially aligned with a corresponding grooming element forming a grooming element—shroud element pair.

Referring now to FIG. 4, an orthogonal view of an embodiment of a grooming brush 100 of the invention is depicted. In this embodiment, the outer periphery of the brush hub 004 is circular and has a center K through which axis of rotation A passes, the grooming element array has twenty-four grooming elements 001 equidistantly spaced and arranged in a circular pattern, the shroud element array has 24 shroud elements 002 equidistantly spaced and arranged in a circular pattern, and wherein each shroud element 002 is radially aligned with a corresponding grooming element 001 forming a grooming element—shroud element pair indicated as J in FIG. 3. An exemplary radially aligned grooming element—shroud element pair is shown along exemplary radial H. In the embodiment depicted in FIG. 4, there are twenty-four radials, along which twenty-four grooming element—shroud element pairs are aligned. In general, the invention may comprise any number of grooming element—shroud element pairs aligned along radials.

Still referring to FIG. 4, an optional feature comprising a plurality of impeller elements 007 arranged in an impeller vein pattern 300, which may be present in embodiments of the invention, is also depicted. The dashed lines of the figure represent one of many embodiments of a line upon which the centers of the impeller elements 007 may be disposed in order to achieve the impeller vein shape depicted in representative exemplary fashion 300. Thus, any embodiment of the invention may, but does not necessarily, further comprise a plurality of impeller elements 007 extending from the first surface 003 of brush hub 006 in an impeller vein pattern 300 having a center 201, wherein center 201 is disposed upon first surface 003 in proximity to, or collated with, the center K of brush hub 006. In embodiments, impeller elements 007 may comprise a material having a Shore A Hardness between 40-55 and may be of any length, but in embodiments may comprise a length no greater than shroud elements 002. In embodiments, impeller elements 007 may comprise the same materials as, and may extend from first surface 003 the same distance as, shroud elements 002. While an exemplary impeller element arrangement comprising four arms, with four impeller elements 007 per impeller vein arm in FIG. 4, the impeller vein pattern 300 may comprise any number of arms, and each arm may comprise any number of impeller elements 007.

Figure 5:
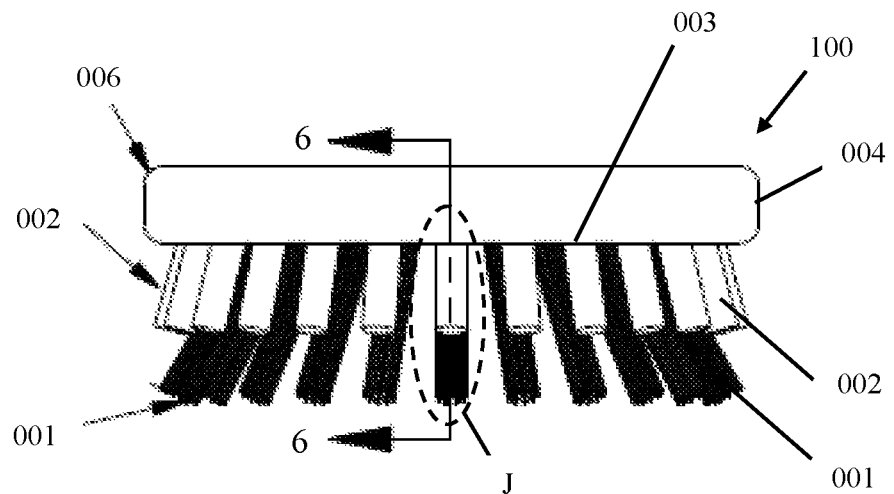
FIG. 5 is a side view of an embodiment of a grooming brush 100 of the invention in which the outer periphery of the brush hub is circular, the grooming element array has twenty-four grooming elements equidistantly spaced and arranged in a circular pattern, the shroud element array has twenty-four shroud elements equidistantly spaced and arranged in a circular pattern, and wherein each shroud element is radially aligned with a corresponding grooming element forming a grooming element—shroud element pair.

Referring now to FIG. 5, a side view of an embodiment of a grooming brush 100 of the invention is depicted in which the outer periphery 004 of the brush hub 006 is circular, the grooming element array has twenty-four grooming elements 001 equidistantly spaced and arranged in a circular pattern, the shroud element array has twenty-four shroud elements 002 equidistantly spaced and arranged in a circular pattern, and wherein each shroud element is radially aligned with a corresponding grooming element forming a grooming element—shroud element pair J. Brush hub first surface 003 is shown for reference.

In any embodiment, the grooming elements comprising the grooming element array may be equidistantly spaced from one another. Likewise, in any embodiment, the shroud elements comprising the shroud element array may be equidistantly spaced from one another. However it is not necessary that the grooming elements or shroud elements be equidistantly spaced from one another.

Figure 6:
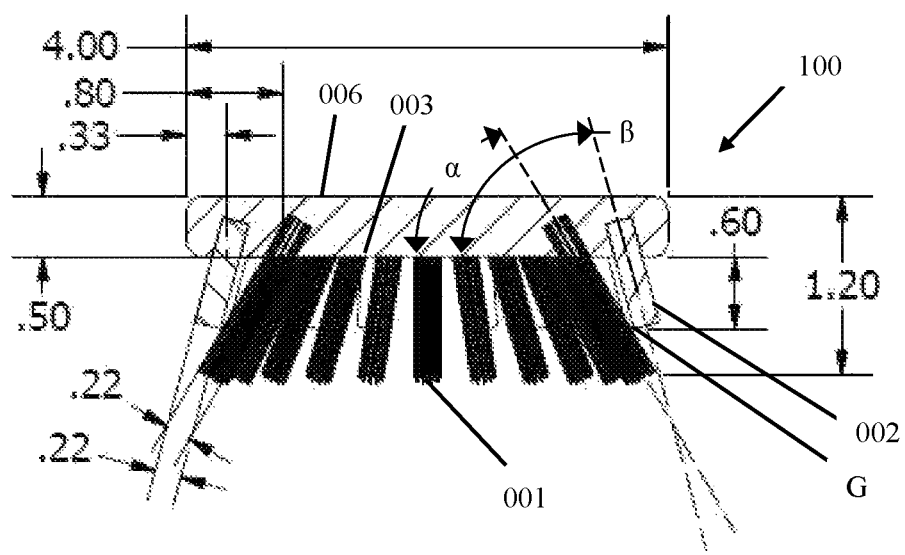
FIG. 6 is cross sectional view of an exemplary embodiment of a grooming brush of the invention, provided to show a non-limiting example of the invention, in which example dimensions, in inches, are given for some grooming brush features.

Referring now to FIG. 6, a cross sectional view of an exemplary embodiment of a grooming brush of the invention 100 is depicted. This figure is provided to depict a non-limiting example of an embodiment of the invention. Grooming elements 001 are disposed at a second angle α to first surface 003 of brush hub 006. In embodiments, angle α may range between 90 degrees and 45 degrees. Likewise, shroud elements 002 are disposed at a first angle β to first surface 003 of brush hub 006. In embodiments, angle β may range between 90 degrees and 60 degrees. In embodiments, angle β is greater than angle α. In an exemplary embodiment of the grooming brush of the invention, angle α is 60 degrees, and angle β is 75 degrees. Grooming elements 001 may extend from first surface 003 of brush hub 006 a greater distance than shroud elements 002 extend from first surface 003 of brush hub 006. Shroud elements 002 may contact grooming elements 001 at point G, contacting and providing support for grooming elements 001 when grooming brush 100 is placed against a surface to be groomed and rotated, causing vortical flow which in turns creates the low pressure are in the substantially enclosed volume, creating the resulting force that pulls brush hub 006 towards the surface to be clean and bending, or splaying, grooming elements away from the axis of rotation. In an embodiment in which each grooming element is aligned radially with a corresponding shroud element forming grooming element—shroud element pair J as shown in FIGS. 3, 4 and 5, each shroud element 002 contacts, and provides support to, its corresponding grooming element 001 at G.

Figure 7:
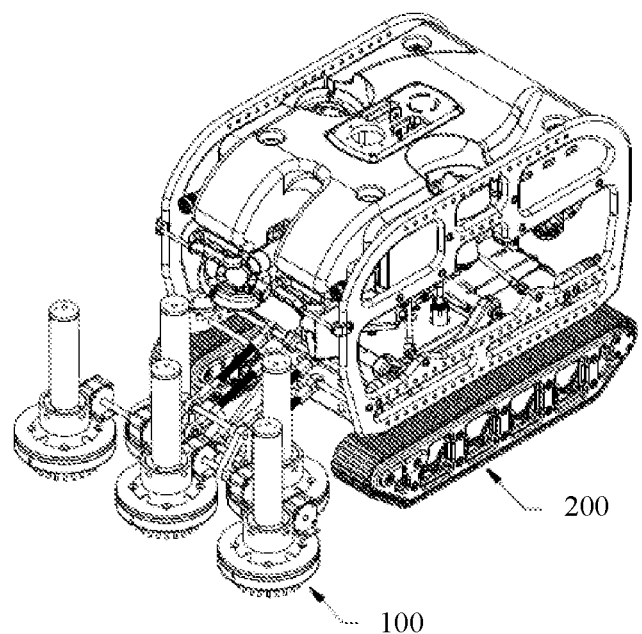
FIGS. 7 and 8 depict a perspective and orthogonal view, respectively, of an embodiment of the invention that includes a remotely operated vehicle to move the grooming brushes over the surface to be groomed and an apparatus for rotating at least one, and preferably a plurality, of grooming brushes of the invention as may be utilized to groom large ship hulls or other underwater surfaces to be groomed.
Figure 8:
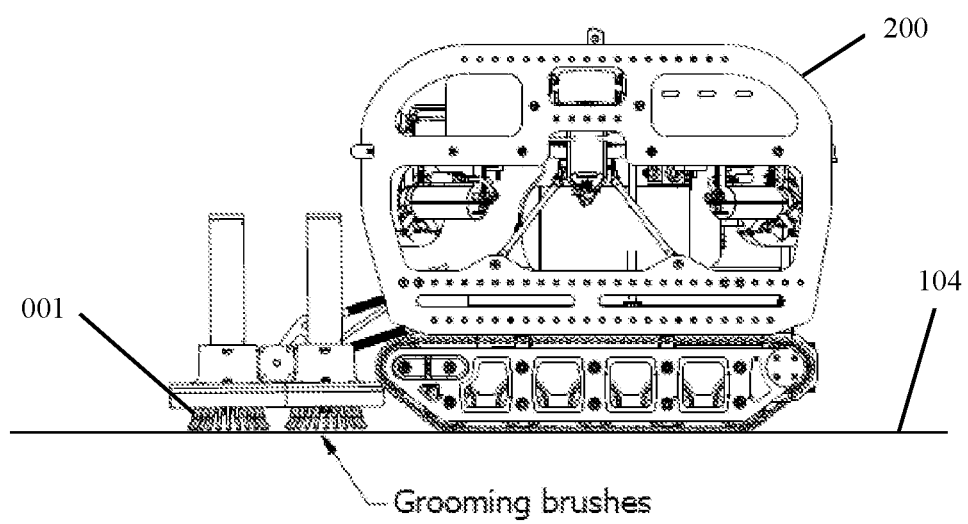

Referring now to FIGS. 7 and 8, a perspective and an orthogonal view, respectively, of an embodiment of the invention that includes a remotely operated vehicle 200 to move the grooming brushes 001 over the surface to be groomed and an apparatus for rotating at least one, and preferably a plurality, of grooming brushes 100 of the invention as may be utilized to groom large ship hulls is depicted. The apparatus may also provide motivation of the grooming brushes 100 across a ship hull, and may be remotely controlled. One example of such an apparatus such as the remotely operated vehicle previously described, and used for more industrial hull grooming of larger vessels. These other embodiments may employ any source of rotation such as electric or hydraulic motors.

In any embodiment, the grooming elements 001 of the invention may comprise any polymeric material that may be formed as either solid studs or as a plurality of bristles. In embodiments the grooming elements 001 may comprise polypropylene, nylon, polyester, delrin, or any polymer with a modulus of elasticity between 0.6 and 3.6 GPa. As an example, the grooming brush depicted exemplary embodiment of FIG. 6 is comprised of grooming elements in the form of a plurality of individual polypropylene bristles, each bristle of 0.01 inch diameter, forming a bundle of bristles. The bundle of bristles is attached to first surface 003 of brush hub 006. In an embodiment, bristle diameters may range from 0.3-0.5 mm in diameter and bristle length may range from 15-35 mm. In an embodiment, the bristle bundle diameters may range from 3.3-4.0 mm. These dimensions were chosen for the purpose of testing the grooming brush of the invention for grooming biofilms and incipient fouling from a surface to be groomed. In embodiments, one function of the shroud elements is to isolate the low pressure region in the substantially enclosed volume by creating a semi-impermeable wall around the brush. The shroud elements 002 may also control the distance between the brush hub first surface 003 and the surface to be groomed 104 when the tips of the shroud elements are in contact with the surface to be groomed 104, hence preventing the brush hub first surface 003 from contacting, or bottoming out, on the surface to be groomed 104 and thereby causing damage the surface to be groomed 104 or to any protective coating that may comprise the surface to be groomed 104 such as anti-fouling coatings or other coatings, or paint.

In any embodiment, the shroud elements 002 of the invention may comprise any flexible material. In embodiments the shroud elements 002 may comprise Buta-N rubber, such as the rubber that is used in the manufacture of shock cords. In embodiments the shroud elements 002 of the invention may comprise any material having a Shore A Hardness between 40-55.

The outer periphery 004 brush hub 006 of the invention may take on any shape. The outer periphery of the brush hub 006 may be circular as shown in FIGS. 1-6 or may be any desired shape. Regardless of the shape of outer periphery 004 of brush hub 006, the thickness of the brush hub 006 may be uniform, or alternatively, may vary. For example, in embodiments, brush hub first surface 003 may be, but is not necessarily, planar. In embodiments, a generally planer brush hub first surface 003 may have an inset portion or multiple inset portions towards the center of the brush hub. Alternatively, brush hub first surface 003 may be generally convex or concave in structure.

Different material properties of the shroud and grooming elements, such as, for example modulus, hardness, creep, fatigue strength and water absorption, and different physical properties, such as, for example diameter, length, and number of bristles comprising an element, can be utilized to aid in the generation of the low pressure region created in the brush hub and/or the efficiency of grooming. The arrangement of the grooming elements 001, such as, for example, the relative location of the bristles to each other, the angle of the grooming elements and the height of the grooming elements above first surface 003 of brush hub 006 can also be optimized to aid in the generation of the low pressure region created in the brush hub or the efficiency of grooming.

Figures 9, 10:
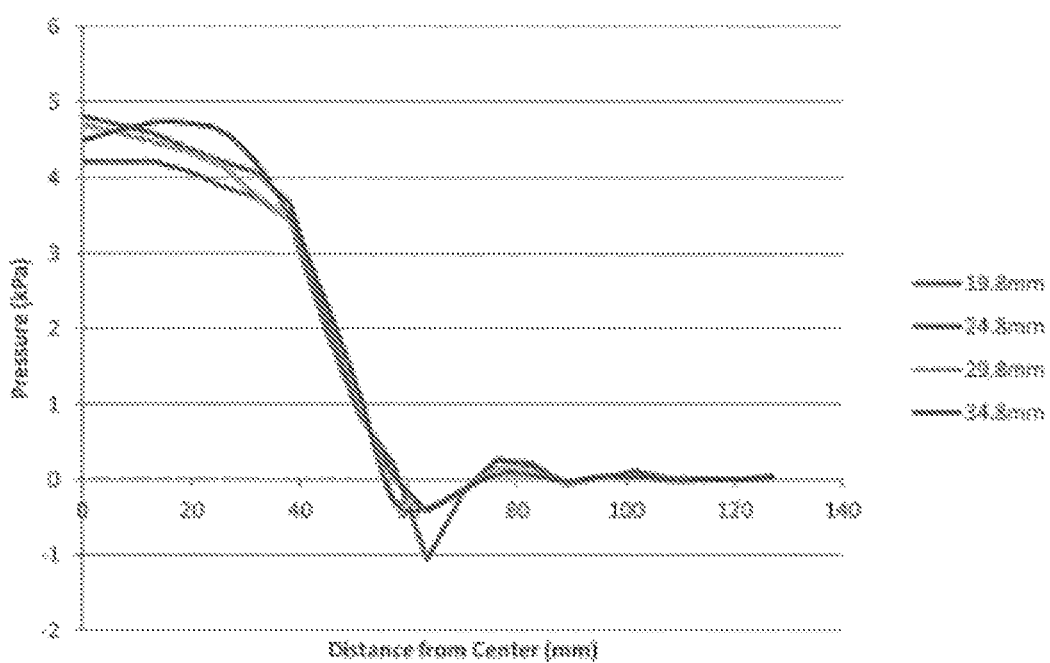
FIG. 9 is a table illustrating the attachment forces (given in attachment force per unit power input (N/W)) generated by vertically rotating exemplary vertically rotating exemplary grooming brushes having a shroud of various heights at various speeds.
FIG. 10 is a graph illustrating the distribution of the low pressure region developed by vertically rotating an embodiment of grooming brush 100 held at different heights above a test surface (given in centimeters), wherein the y-axis represents the negative pressure region relative to ambient water pressure of the same depth, outside the brush, and the x-axis represents the distance from the center of the brush at which the measurement was taken.

The brushes described herein were tested in a laboratory facility to determine attachment efficiency, and were field tested for grooming optimization. It was found that the attachment forces generated are a function of both brush hub diameter and rotational speed. Measured data is shown in FIG. 9 that visually describes the increasing trend of attachment force D generated with an increase in both brush rotational speed and brush diameter. The brush rotational speed is presented as tip speed in order to compare different diameter brushes. The exemplary tip speeds tested at approximately 1.2-3.4 m/s were equivalent to 200-1100 rpm. The rotational speed of the brushes can be varied according to the application of the grooming. More tenacious fouling will require higher speeds for removal. The higher rotational speed will increase the resulting attachment force and the forces generated at the bristle tip against the unwanted material. Larger diameter brushes will generate more attachment force and use greater power.

Figure 11:
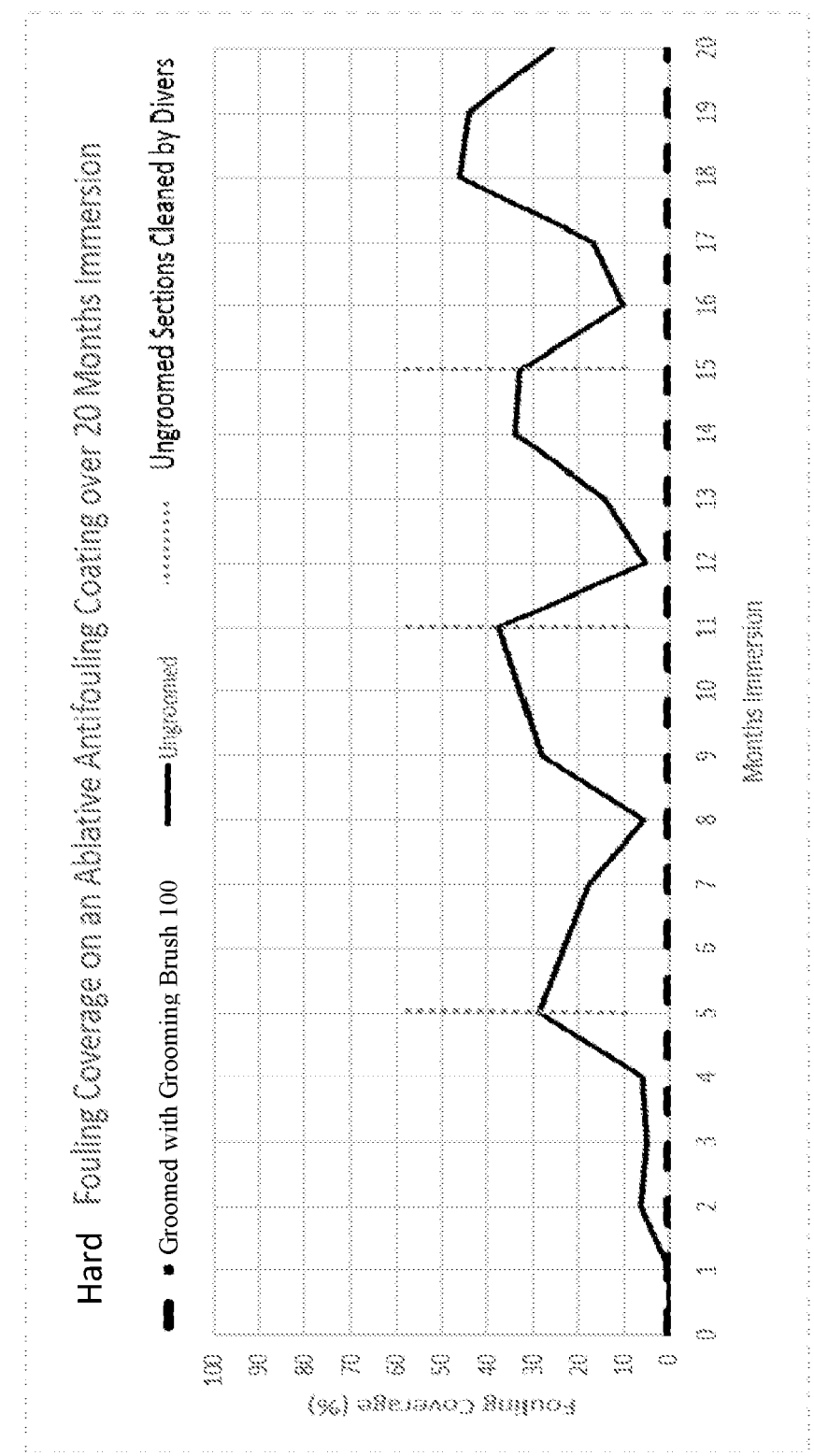
FIG. 11 is graph illustrating the grooming efficiency of embodiments of vertically rotating grooming brushes of the invention, showing a dramatic reduction in unwanted materials on an ablative antifouling-coated surface.

Referring now to FIGS. 9, 10 and 11, the efficiency of grooming brush 100 is increased by the incorporation of shroud elements. Attachment force generated by a brush with a shroud may be increased by about as much as 30%, compared to forces generated by a brush without a shroud. FIG. 9 shows the change in attachment force with a change in shroud element height. Depending on the stiffness to the grooming elements, rotational speed, diameter of the brush hub, and the incorporation of a shroud, the grooming brush of the invention 100 can be implemented in a wide variety of grooming activities. The grooming brush 100 generates a low pressure region by creating a flow that is vortical in nature when it is rotated. A rotational flow is established as well as a vortical flow in the center of the brush hub. This isolated flow acts similarly to a tornado and causes a low pressure region to form in the substantially enclosed volume that causes the brush to adhere the surface of the structure being cleaned. FIG. 10 shows the pressure distribution inside of a brush cavity and illustrates the grooming bristle tufts isolating the low pressure region from the surrounding environment. Because the vortical flow is semi-contained within the brush cavity, the attachment force D generated is more energy efficient than a traditional "open" pump system. Brush parameters can be varied based on the forces required to groom or clean a surface. FIG. 11 shows the results from a grooming study using the grooming brush of the invention, and demonstrates the efficiency of fouling removed by the grooming brush of the invention 100.

The grooming frequency associated with a grooming brush of the invention 100 is based on several factors, such as site location, water temperature, salinity, nutrient concentration, and time of year. The grooming attachment brush can proactively remove biofilms and incipient fouling, so it can be used when such fouling is found on immersed structures.

A plurality of grooming attachment brushes may be coupled together to increase the surface area to be cleaned. A grooming tool system of the invention may be adapted to fit the grooming application, and attachment needed for any substrate that requires the removal of unwanted material from the surface to be groomed including silt, slimes and incipient fouling. Embodiments of the grooming tool system may comprise a train, sprocket, chain, or belt drive system coupled to a single motor. The system may provide for control and monitoring of the rotational speed of the brushes. Embodiments of the grooming tool system may have each brush controlled by independent motors. Embodiments of the grooming tool system can be mounted to an underwater remote/autonomous vehicle or may be adapted to be used as a hand held system or tool.

Embodiments of the present invention may operate without the need for an open impeller or magnet which allows the vehicle design to be smaller and more energy efficient.

The invention may also comprise a method for removing biofouling from a surface to be groomed without damaging a hull coating, comprising the steps of providing a grooming brush 100, the grooming comprising: a brush hub having first surface, an outer periphery, and an axis of rotation; a plurality of shroud elements attached to, and extending away from, the first surface; a plurality of grooming elements attached to, and extending away from, the first surface; wherein each shroud element is defined as having a first length and each grooming element is defined as having a second length, wherein the first length is less than the second length; wherein said plurality of shroud elements are attached to the first surface forming a shroud element array, the shroud element array inset from said brush hub outer periphery by a shroud element inset distance; and wherein the plurality of grooming elements are attached to the first surface forming a grooming element array, the grooming element array inset from the brush hub outer periphery by a grooming element inset distance; wherein the grooming element inset distance is greater than the shroud element inset distance; wherein the quantity of shroud elements forming said plurality of shroud elements and the quantity of grooming elements forming said plurality of shroud elements are the same in number; wherein each shroud element is radially aligned with a corresponding grooming element; and wherein each shroud element is disposed at a first angle relative to the brush hub first surface 003, and each grooming element is disposed at a second angle relative to the brush hub first surface 003, the first angle being greater than said second angle, such that each shroud element is in contact with and supports its corresponding grooming element when the grooming brush 100 is pulled against a surface to be groomed causing the grooming elements distal ends to bend away from the grooming brush axis of rotation; placing the grooming brush against the surface to groomed; rotating the grooming brush at a speed of rotation, causing a low pressure area to develop within the volume created by the surface to be groomed, the brush hub first surface, and the array of grooming elements. The low pressure creates a resulting force D tending to pull the brush first surface 003 against the surface to be groomed 104.

The method may further be defined as having a speed of rotation that is between 200 and 1100 rotations per minute.

The method may create a resulting force pulling brush 100 towards surface to be cleaned 104 D that is between 7.0 and 10.0 pounds.

The method may further include the step of varying said speed of rotation until the resulting force is within a range that is effective to remove a desired amount of silt, sediment and biofouling from the surface to be groomed, without causing damage to a protective coating disposed on the surface to be groomed.

The brush used in the method of the invention may further comprise a grooming brush comprising a plurality of impeller elements extending from first surface 003 arranged in an impeller vein pattern having a center K, wherein the center of the impeller vein pattern is disposed upon or in proximity to said axis of rotation, and wherein the impeller elements are defined as comprising a material having a Shore A Hardness between 40-55 and having a length no greater than the shroud elements.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

Although a detailed description as provided in the attachments contains many specifics for the purposes of illustration, anyone of ordinary skill in the art will appreciate that many variations and alterations to the following details are within the scope of the invention. Accordingly, the preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

What is claimed is:

1. A grooming brush for removing biofouling from a surface, comprising:
    a brush hub having a first surface, an outer periphery, and an axis of rotation;
    a plurality of individual shroud elements attached to, and extending away from, said first surface;
    a plurality of individual grooming elements attached to, and extending away from, said first surface, each of the plurality of individual grooming elements having a distal end at a point along said grooming element that is furthest from said first surface;
    each individual grooming element comprising a solid stud or bundle of individual bristles;
    wherein each shroud element of the plurality of individual shroud elements is defined as a solid flexible stud structure having a first length and each individual grooming element of the plurality of individual grooming elements is defined as having a second length, wherein said first length is less than said second length;
    wherein said plurality of shroud elements are attached to said first surface forming a shroud element array, said shroud element array inset from said brush hub outer periphery by a shroud element inset distance and wherein each of said plurality of shroud elements forming said array is separated from its adjacent shroud elements such that a gap is formed between adjacent shroud elements, allowing fluid to pass between the shroud elements; and
    wherein said plurality of individual grooming elements are attached to said first surface forming a grooming element array, said grooming element array inset from said brush hub outer periphery by a grooming element inset distance;
    wherein said grooming element inset distance is greater than said shroud element inset distance;
    wherein a quantity of individual shroud elements forming said plurality of individual shroud elements and a quantity of individual grooming elements forming said plurality of individual grooming elements are the same;
    wherein each of the plurality of individual shroud elements is radially aligned with a corresponding individual grooming element, forming grooming element-shroud element pairs; and
    wherein each individual shroud element of the plurality of individual shroud elements is disposed at a first angle relative to said brush hub first surface, and each individual grooming element of the plurality of individual grooming elements is disposed at a second angle relative to said brush hub first surface, said first angle being greater than said second angle, such that each of the plurality of individual shroud elements is in contact with and supports its corresponding individual grooming element when said grooming brush is pulled against a surface to be groomed causing said individual grooming elements distal ends to bend away from said grooming brush axis of rotation.

2. The grooming brush of claim 1;
wherein said first angle is between 90 degrees and 60 degrees, and wherein said second angle is between 90 degrees and 45 degrees.

3. The grooming brush of claim 1;
wherein said first length is between 0.25 and 1.5 inches, and wherein said second length is between 0.50 and 2.0 inches.

4. The grooming brush of claim 1;
wherein said shroud elements comprise a material that exhibits a Shore A Hardness between 40-55.

5. The grooming brush of claim 1;
wherein said shroud elements comprise a Buta-N rubber.

6. The grooming brush of claim 1;
wherein said grooming elements comprise polymeric materials selected that are formed as either solid studs or as a plurality of bristles.

7. The grooming brush of claim 1;
wherein said grooming elements are further defined as comprising polypropylene.

8. The grooming brush of claim 1;
wherein said grooming elements comprise a polymer with a modulus of elasticity between 0.6 and 3.6 GPa.

9. The grooming brush of claim 1, further comprising a plurality of impeller elements extending from said first surface in an impeller vein pattern having a center, wherein said center of said impeller vein pattern is disposed upon said axis of rotation, and wherein said impeller elements are defined as comprising a material having a Shore A Hardness between 40-55 and having a length no greater than said shroud elements.

10. A method for removing biofouling from a surface to be groomed without damaging a coating on the surface to be groomed, comprising:
    providing a grooming brush, said grooming brush comprising:

a brush hub having a first surface, an outer periphery, and an axis of rotation;

a plurality of individual shroud elements attached to, and extending away from, said first surface;

a plurality of individual grooming elements attached to, and extending away from, said first surface, each of the plurality of individual grooming elements having a distal end at a point along said grooming element that is furthest from said first surface;

each individual grooming element comprising a solid stud or bundle of individual bristles;

wherein each shroud element of the plurality of individual shroud elements is defined as a solid flexible stud structure having a first length and each individual grooming element of the plurality of individual grooming elements is defined as having a second length, wherein said first length is less than said second length;

wherein said plurality of shroud elements are attached to said first surface forming a shroud element array, said shroud element array inset from said brush hub outer periphery by a shroud element inset distance and wherein each of said plurality of shroud elements forming said array is separated from its adjacent shroud elements such that a gap is formed between adjacent shroud elements, allowing fluid to pass between the shroud elements; and wherein said plurality of grooming elements are attached to said first surface forming a grooming element array, said grooming element array inset from said brush hub outer periphery by a grooming element inset distance;

wherein said grooming element inset distance is greater than said shroud element inset distance;

wherein a quantity of individual shroud elements forming said plurality of individual shroud elements and a quantity of individual grooming elements forming said plurality of individual grooming elements are the same;

wherein each of the plurality of individual shroud elements is radially aligned with a corresponding individual grooming element, forming grooming element-shroud element pairs; and wherein each individual shroud element of the plurality of individual shroud elements is disposed at a first angle relative to said brush hub first surface, and each individual grooming element of the plurality of individual grooming elements is disposed at a second angle relative to said brush hub first surface, said first angle being greater than said second angle, such that each of the plurality of individual shroud elements is in contact with and supports its corresponding individual grooming element when said grooming brush is pulled against a surface to be groomed causing said individual grooming elements distal ends to bend away from said grooming brush axis of rotation;

placing said grooming brush against the surface to be groomed; and rotating said grooming brush at a speed of rotation, causing a low pressure area to develop within a volume created by the surface to be groomed, said brush hub first surface, and the grooming elements array;

said low pressure area creating a resulting force tending to pull said plurality of individual grooming elements against the surface to be groomed;

wherein said resulting force is sufficient to remove biofouling from the surface to be groomed without removing a protective coating of the surface to be groomed.

11. The method of claim 10, wherein said speed of rotation is between 200 and 1100 rotations per minute.

12. The method of claim 10, wherein said resulting force is between 7.0 and 10.0 pounds.

13. The method of claim 10;

wherein the plurality of grooming elements comprise polymeric materials selected that are formed as either solid studs or a plurality of bristles.

14. The method of claim 10;

wherein said first angle is between 90 degrees and 60 degrees, and wherein said second angle is between 90 degrees and 45 degrees.

15. The method of claim 10;

wherein said first length is between 0.25 and 1.5 inches, and wherein said second length is between 0.50 and 2.0 inches.

16. The method of claim 10;

wherein the plurality of shroud elements comprise a material that exhibits a Shore A Hardness between 40-55 and wherein said the plurality of grooming elements comprise a polymer with a modulus of elasticity between 0.6 and 3.6 GPa.

17. The method of claim 10;

wherein the plurality of shroud elements comprise a Buta-N rubber and wherein the plurality of grooming elements are further defined as comprising polypropylene.

18. The method of claim 10, further including the step of varying said speed of rotation until said resulting force is within a range that is effective to remove a desired amount of unwanted material from said surface to be groomed, without causing damage to a protective coating disposed on the surface to be groomed.

19. The method of claim 10, wherein said grooming brush further comprises a plurality of impeller elements extending from said brush hub first surface arranged in an impeller vein pattern having a center, wherein said center of said impeller vein pattern is disposed upon said axis of rotation, and wherein said impeller elements are defined as comprising a material having a Shore A Hardness between 40-55 and having a length no greater than the plurality of shroud elements.

* * * * *